United States Patent [19]

Collins et al.

[11] Patent Number: 4,656,624
[45] Date of Patent: Apr. 7, 1987

[54] OPERATOR COMMUNICATION ARRANGEMENTS FOR OPERATOR ASSISTANCE SYSTEMS

[75] Inventors: Johnny Collins; Michael H. Cooper, both of Oak Park; Douglas C. Dowden; Raymond J. Gill, both of Naperville; Meyer J. Zola, Oak Park, all of Ill.

[73] Assignee: AT&T Bell Laboratories, Murray Hill, N.J.

[21] Appl. No.: 730,765

[22] Filed: May 3, 1985

[51] Int. Cl.$^4$ ................ H04M 3/60; H04Q 11/04
[52] U.S. Cl. ........................ 370/60; 370/62; 379/94; 379/265
[58] Field of Search ............ 370/60, 94, 85, 62; 179/27 D

[56] References Cited

U.S. PATENT DOCUMENTS

| | | | |
|---|---|---|---|
| 3,975,597 | 8/1976 | Voise et al. | 179/27 D |
| 4,451,704 | 5/1984 | Winkelman | 179/27 D |
| 4,468,528 | 8/1984 | Reece et al. | 179/27 D |
| 4,510,351 | 4/1985 | Costello et al. | 179/27 D |
| 4,539,676 | 9/1985 | Lucas | 370/60 |
| 4,592,048 | 5/1986 | Beckner et al. | 370/60 |

OTHER PUBLICATIONS

"DMS-200 Operator Services Planning Letter," *Northern Telecom*, (manufacturer's brochure), Jan. 26, 1984, pp. 60-68.
"DMS-200 (AOSS) Auxiliary Operator Services System," *Northern Telecom Courier*, DC-16, Nov. 1983, pp. 1-12.
"TOPS Operator Centralization DMS-200," *Northern Telecom*, (manufacturer's brochure), Nov. 1983, pp. 1-3.
N. X. DeLessio et al., "An Integrated Operator Services Capability for the 5ESS TM Switching System," *ISS* '84, (Florence), Session 22C, Paper 3, May 1984, pp. 1-5.
J. W. Johnson et al., "Integrated Digital Services on the 5ESS TM System," *ISS* '84, (Florence), Session 14A, Paper 3, May 1984, pp. 1-8.
"Operator Services Position System," *AT&T Technologies, Inc.*, (manufacturer's brochure), 1984, pp. 1-8.
K. Fung et al., "Integrated Digital Access Design for ISDN," *IEEE International Conference on Communications*, vol. 2, Jun. 19-22, 1983, pp. 1389-1395.
T. Andersson et al., "Operator Services in AXE 10. Addition of a New Subsystem," *IEEE International Conference on Communications*, vol. 2, Jun. 13-17, 1982, pp. 31.3.1-31.3.5.
D. V. Glen, "Integrated Services Digital Networks, Standards, and Related Technology," *U.S. Department of Commerce*, Jun. 1982, pp. 1-133.
J. B. Jacob et al., "The E10.B Digital Switching System: Towards the Integrated Services Digital Network (ISDN)," *International Switching Symposium* 1981 (Montreal), Session 14A, Paper 3, Sep. 1981, pp. 1-6.
G. Oliver et al., "The Subscriber Terminal Concentrator E10-CT and Its Use in the French Electronic Telephone Directory Service," *International Switching Symposium* 1981 (Montreal), Session 14A, Paper 4, Sep. 1981, pp. 1-8.
M. Ballard et al., "The E10.S-TSS.5: A Multipurpose Digital Switching System," *International Switching Symposium* 1981 (Montreal), Session 14A, Paper 1, Sep. 1981, pp. 1-9.
R. Delit et al., "ITT 1240 Digital Exchange Operator Subsystem," *Electrical Communication*, vol. 56, No. 2/3, 1981, pp. 248-263.

*Primary Examiner*—Douglas W. Olms
*Assistant Examiner*—Curtis Kuntz
*Attorney, Agent, or Firm*—Werner Ulrich; Peter Visserman

[57] ABSTRACT

An operator or agent position, for use by a telephone assistance operator or an agent of a business, communicates with the circuit and packet switching network of a telecommunication switching system using an Integrated Devices Digital Network (ISDN) B-channel and D-channel. The switching network is connected to customers, positions, data communication paths to data bases, and a data path to control processor of the system. The B-channel is connected through a circuit switching network to a customer. The D-channel is connected through a packet switching network to the control processor and to data bases. Advantageously, the positions can be located remotely from the switching network because only a single integrated facility is required to transmit the integrated voice and data signal between a position and the network. Advantageously, a variety of data bases can be rapidly and efficiently accessed by a position.

25 Claims, 14 Drawing Figures

QUEUE CONTROL AND QUEUE BLOCKS

PROCESS BLOCK

QUEUE CONTROL AND QUEUE BLOCKS

PROCESS BLOCK

OPERATOR COMMUNICATION ARRANGEMENTS FOR OPERATOR ASSISTANCE SYSTEMS

CROSS-REFERENCE TO RELATED APPLICATION

This application is related to the application of J. C. Dalby, Jr. and C. E. W. Ward, entitled "Agent Communication Arrangements for Telecommunications Systems" which application is assigned to the assignee of the present application, and is being filed concurrently herewith.

TECHNICAL FIELD

This invention relates to operator assistance systems used in telecommunication networks and specifically to an arrangement in an operator assistance system for providing integrated voice and data communications to operator positions.

BACKGROUND OF THE INVENTION

Modern telephone operator assistance systems automatically perform many of the functions required for completing customer-dialed operator assistance calls. The operation assistance system includes a switching network, a control processor and one or more operator positions. The processor typically accumulates data concerning a call and controls the display of that data on a terminal at the operator position. Using this data about the current state of a call, an attending operator communicates via a voice connection with the customer and keys additional call control and call record data into the terminal. The display control and call control data is sent between the operator position and the control processor used to control the switching network. In response to the keyed control data, the control processor effects call configuration changes, such as a call connection or disconnection, in the switching network, and records billing and other call record data.

Operator positions are connected to customers over a voice path. In the prior art, display and control data has been sent over a separate path between the operator position and the control processor. The use of such a separate control path makes it costly to locate operators far away from the switching network and control processor. Further, provision of modern operator assistance services frequently requires that the operators have access to remote data bases. Access to such data bases is provided over these separate paths via the processor of the operator switch, or via separate paths between the operator positions and the data bases. Such arrangements are slow and inefficient, and place a large and increasing data processing load on the control processor, limiting its capacity to serve operator assistance calls, or, alternatively, are inefficient in their use of data transmission facilities.

A recognized problem in the prior art, therefore, is the expense of locating operators far from their associated operator assistance systems and of locating small teams of operators in different remote sites. A further problem of the prior art is that no good arrangement exists for permitting operators to access a variety of data bases.

SUMMARY OF THE INVENTION

The aforementioned problem is solved and an advance is achieved in the art by providing an operator position with integrated voice and data access through a communication facility, for carrying integrated data and voice signals to a switching network; the switching network switches the voice signals in a circuit switching network connectable to customer stations, and switches the data signals to a control processor of the operator assistance system through a packet switching network. At the operator position, the data input signal is used to receive data for generating a visual output, and the data output signals represent data generated from input by an operator at the operator position. Advantageously, the operator positions may be economically located remotely from the switching network at any convenient location such as a small service center or even a residence, since only a single facility is necessary for transmitting the integrated signal used for communicating with the operator positions.

In accordance with one aspect of the invention, the data signal from an operator position is switched in the packet switching network for further connection to one or more data bases. Advantageously, such an arrangement allows for rapidly changeable data connections between the operator position and a variety of data sources and data receivers.

In one specific embodiment of the invention, the operator position is connected to a switching network of an operator assistance system by a path carrying an integrated signal via a 64 kilobit B-channel and an associated 16 kilobit data channel or D-channel, such as the channels proposed for use in an Integrated Services Digital Network (ISDN). The B-channel is used for voice communications with customers and other operators and the D-channel is used for data communications with a processor of the operator assistance system or with one or more data bases, and for providing operator control of customer voice connections. The D-channel is switched via a packet switching network within the operator assistance system. The data from the operator position can be used to control the setup of customer connections, voice connections between the operator position and a customer station, and data connections between the operator position and a variety of data bases. A data network for accessing many data bases may also be connected to the packet switching network. Advantageously, such an arrangement is geared to be compatible in an economic manner with ISDN services and to communicate with other ISDN terminals and data bases. Advantageoulsy, a variety of data bases may be rapidly accessed from the operator position.

In one specific embodiment, the switching network includes a packet switching network, a circuit switching network, and multiplexors to integrate and separate data and voice channels for transmission to operator positions. Advantageously, this facilitates separate switching of voice and data channels to an operator position.

In one specific embodiment, the packet switching network includes protocol conversion facilities. Advantageously, this permits different protocols to be used for data communications among operator positions, data bases, and the control processor.

One specific embodiment of an operator position includes data input/output equipment, associated with a data channel, voice equipment associated with a voice channel, and a multiplexor/demultiplexor for integrating and separating the voice and data channels. The data channel is connected to a terminal processor for controlling a visual display and for converting input signals from a keyboard into data and control messages. Advantageously, such an arrangement permits an operator to carry out the operator tasks efficiently by providing voice access to customers in conjunction with the data access to the appropriate data bases.

BRIEF DESCRIPTION OF THE DRAWING

The invention will be better understood from the following detailed description when read with reference to the drawing in which.

DETAILED DESCRIPTION

Figure 1:
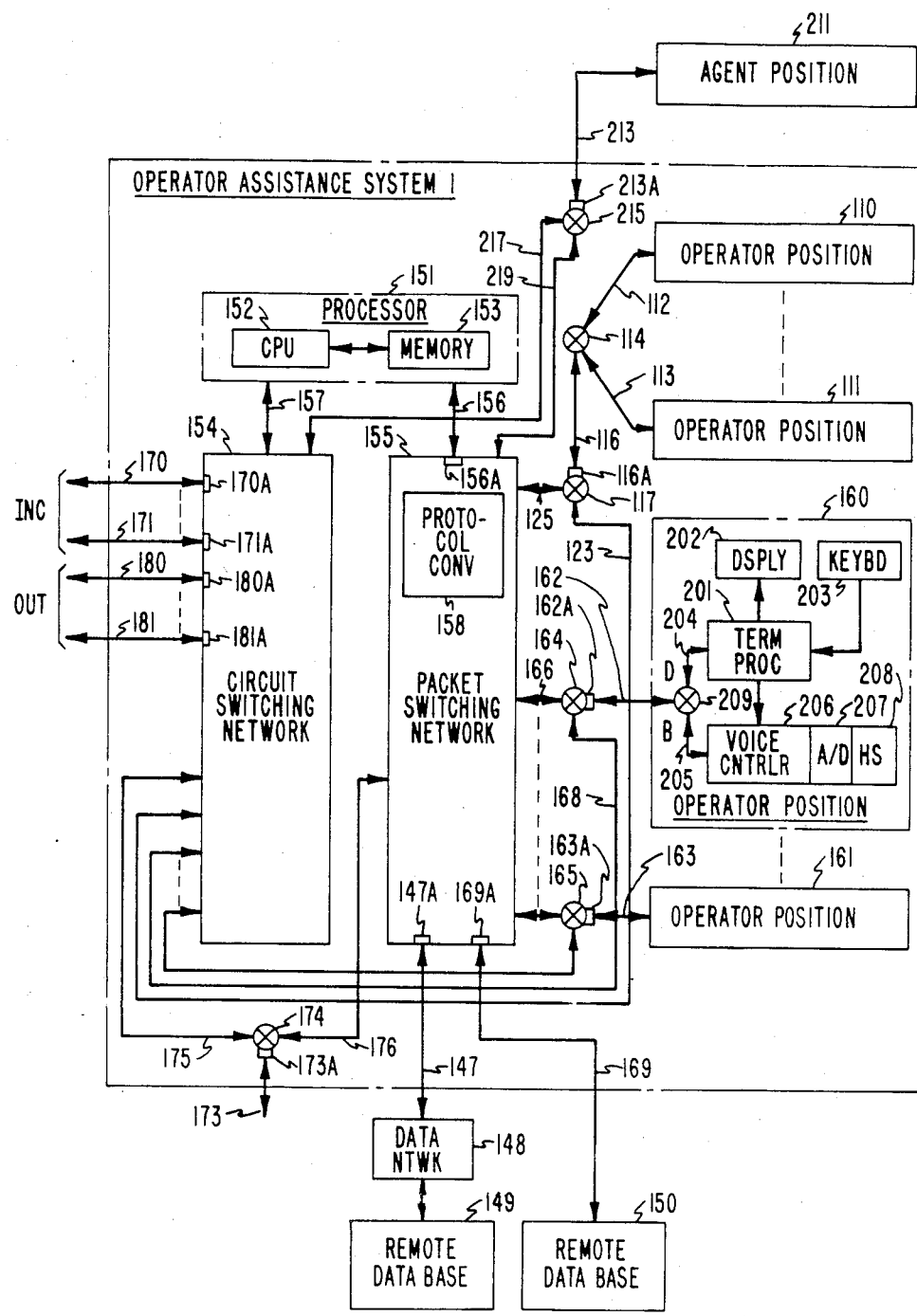
FIGS. 1 and 8 are system block diagrams of telecommunication systems.

FIG. 1 is a block diagram of an illustrative telecommunication system. FIG. 1 includes an exemplary embodiment of an operator assistance position or agent position. Operator assistance positions are used by telephone company attendant operators to help customers set up calls, record appropriate billing data, give directory assistance, etc. Agent positions are used by the employees of a business such as travel agents, order clerks, and airline reservation agents, to provide a service to their customers. Both agent positions and operator positions can be served by the system of FIG. 1.

In this detailed description, the use of an integrated signal for communication with one of these positions is illustrated with respect to calls to operator assistance positions and calls to agent positions. Both types of calls use the same principles of combining and separating voice and data channels, and switching the voice and data channels separately in a switching network. The two types of calls differ in that the data communications for an operator assistance call are predominantly between the operator position and a processor of the operator assistance system, whereas the data communications for an agent call are predominantly to one or more data bases not associated with an operator assistance or other telecommunications switching system. Both types of calls are described hereinafter.

Operator Assistance Calls

An operator assistance system serves operator positions and may also offer a variety of other services. FIG. 1 shows an operator assistance system 1 connected to a group of incoming lines 170, ..., 171, connected to customers, or incoming trunks from other switching systems, or both, which are connected to ports 170A, ..., 171A on a circuit switching network 154. Circuit switching network 154 may be any well known digital telecommunication circuit switching network. For convenience, lines, which are commonly two-way, and those trunks which are two-way, are designated as incoming or outgoing according to the function performed in a particular call. Circuit switching network 154 of operator assistance system 1 is also connected to a group of operator positions 160, ..., 161 via interconnection paths 162, ..., 163 that are connected to ports 162A, ..., 163A on multiplexors 164, ..., 165. Interconnection paths 162, ..., 163 may use digital carrier facilities if the operator positions are physically remote from the switching networks. Also shown are outgoing lines or trunks 180, ..., 181 connected to ports 180A, ..., 181A on circuit switching network 154 of operator assistance system 1; outgoing trunks are also connected to other switching systems.

The ports are an interface between the switching network and connected transmission units such as customer lines, trunks to other offices, multiplexed transmission facilities, and data interfaces to data communication systems and to control processors. For a customer line, a port may be a line circuit which converts analog to digital signals, provides service request detection facilities and otherwise interfaces between the digital signals of a digital network and the analog signals of a conventional customer loop. For a trunk, the interface may be a facility interface with one channel of a frequency division multiplexed transmission facility. For use with time division multiplex facilities, such as the T1 carrier system manufactured by AT&T Technologies, Incorporated, or time division subscriber loop carrier systems, the port may directly interface a digital signal, carrying a number of time multiplexed channels, with the digital switching network.

The operator assistance and agent positions are arranged to work in an integrated services digital network (ISDN) environment. The concepts of ISDN have been extensively studied by the International Telegraph and Telephone Consultative Committee (CCITT) and are described, for example, in *International Tellecommunications Standrds: Issues and Implications for the 80's—A Summary Record of a July 1982 Workshop*, edited by D. M. Cerni and E. M. Gray and published in May, 1983, by the U.S. Department of Commerce (Document NTIA-SP-83-15).

The operator positions 160, ..., 161 are compatible with ISDN and are referred to as ISDN terminals. ISDN terminals are arranged to receive and transmit a single digital signal, operating at 16, 80 or 144 kilobits per second (kb). The signal carries a "D-Channel" operating at 16 kb for the transmission of control and data packets, and zero, one or two "B-channels" operating at 64 kb each for the transmission of digitized voice or packetized or unpacketized higher speed data. In FIG. 1, the D-channels carrying data signals are switched by packet switching network 155, while the B-channels, carrying voice channels in this example, are switched by circuit switching network 154. The packet switching network 155 may be any well known packet switching network. The operator position communicates with the rest of the operator assistance system via an 80 kb integrated digital signal, comprising a B-channel and an associated D-channel.

In system 1, the 16 kb D-channels from packet switching network 155 and the 64 kb B-channels from digital circuit switching network 154 are combined in digital multiplexors 164, ..., 165, which may be any well known digital multiplexor, and the integrated signal is routed from ports 162A, ..., 163A over integrated data and voice interconnection paths 162, ..., 163 to operator positions 160, ..., 161. The integrated data and voice signals may be advantageously carried using a multiplexed digital transmission facility if the operator positions are located at a substantial distance from the switching networks.

Data packets from operator or agent positions may be of two types: control packets and data packets. Control packets can be used to transmit a request from an agent or operator position, for, for example, a change of the configuration of a call, such as the addition or disconnection of a port from a voice or data connection, to the control processor 151 used for controlling the system. Such a control packet is routed to the processor 151 which responds by sending proper control signals to the switching networks 154 and 155 to effect the requested action. Herein, both control and data packets are referred to as data or data packets.

Customers signal their requests by lifting their telephone receiver and by dialing. Such communication signals are detected in the circuit switching network 154. The data representing these signals, such as a service request, is sent to processor 151 via control path 157. Processor 151 responds by generating and sending the appropriate control signals to packet switching network 155 and circuit switching network 154 to effect the requested action.

In this description, networks 154 and 155 and the associated multiplexors such as 117, 164, ..., 165, 174, and 215 are considered to be a network with ports such as 116A, 149A, 156A, 162A, ..., 163A, 169A, 170A, ..., 171A, 173A, 180A, ..., 181A, 213A, and the capability for setting up circuit connections between those ports connected directly or through multiplexors to the circuit switching network 154, and for setting up data connections between those ports connected directly or through multiplexors to packet switching network 155. Some of the ports may carry multiplex signals from a plurality of lines, trunks, or positions.

Trunks from distant offices signal their requests either through signals on the trunk or through signals on a separate data facility, using common channel signalling, (CCS). CCS signals would also terminate on a port to the packet switching network (not shown). The signals from trunks and the CCS signals reflect data dialed by a customer, an operator, or an agent, and these, as well as the signals received directly from customers are referred to herein as communication signals.

The interconnection path 162 between operator position 160 and multiplexor 164 represents a path for carrying an integrated signal. Interconnection path 162 can be one of many paths being carried over a single multiplexed facility such as the T1 carrier system, previously cited. This is illustrated explicitly with respect to the group of operator positions 110, ..., 111. These positions are connected by paths 112, ..., 113 to multiplexor 114 which is connected to interconnection path 116, which is connected to port 116A connected to multiplexor 117. Multiplexor 117 is connected by path 123 to circuit switching network 154, and is connected by path 125 to packet switching network 155. In this illustration, paths 116, 123 and 125 all carry signals for all of the operator positions 110, ..., 111. Further, if desired, multiplexor 114 could generate two signals, representing a B-channel and a D-channel, to each of the operator positions 110, ..., 111 and thus eliminate the need for a separate multiplexor, such as multiplexor 209, described below, inside each operator position.

FIG. 1 also shows an agent position 211 connected to system 1 via interconnection path 213 which is connected to port 213A. Interconnection path 213 carries an integrated signal via a B-channel and an associated D-channel. These channels can be carried over path 213 using a multiplexed digital carrier facility in the same way as channels to operator positions can be carried over a multiplexed digital carrier facility. Multiplexor 215 connected to port 213A combines the B-channel carried on path 219 from the connected circuit switching network 154 and the D-channel carried on path 217 from the connected packet switching network 155. This allows the agent position 211 to communicate with operator assistance system 1 in the same way as operator positions 160, ..., 161.

In this example, packet and circuit switching networks are used as shown in FIG. 1. Alternatively, an integrated circuit and packet switching network for use in an ISDN, as described in the copending application by Beckner et al.: "Integrated Packet Switching and Circuit Switching System", Ser. No. 606,937, filed May 3, 1984, and assigned to the assignee of the present application, could be used in implementing the invention. Alternatively, a packet switching network capable of handling packetized voice as well as packetized data could also be used; in such a switch, the function of the circuit switching network 154 is carried out by a packet switching network.

Details of the operator position are illustrated in typical operator position 160 of operator assistance system 1. As shown hereinafter in FIG. 8, an exemplary agent position is similar. Entering operator position 160 is an 80 kb integrated voice and data signal on integrated voice and data interconnection path 162 from port 162A on multiplexor 164. Multiplexor 164 is connected to circuit switching network 154 via path 168 and packet switching network 155 via path 166. The 80 kb combined digital signal comprises one 64 kb B-channel and one 16 kb D-channel. The B-channel is used for voice communications and the D-channel is used for packetized data communications. The 80 kb integrated voice and data signals enter the operator position 160 via interconnection path 162 at position multiplexor 209 which separates the D- and B-channel signals. The B-channel operator voice signal is routed from position multiplexor 209 via path 205 to a voice controller 206, which handles such functions as echo suppression. The voice controller is connected to a bidirectional analog/digital converter 207, which is connected to an operator headset 208 for generating acoustical outputs to and receiving acoustical inputs from an operator. The D-channel operator input data signal is routed from position multiplexor 209 via path 204 to terminal processor 201. Terminal processor 201 generates signals to control voice controller 206, and display 202 for generating visual outputs, and receives signals from a data input keyboard 203, from which it generates operator data output signals to multiplexor 209. Thus, an operator at operator position 160 has a voice connection through circuit switching network 154 to a customer via a B-channel, and a packet switched data connection through packet switching network 155 to processor 151, or to a data communication path such as 147 or 169 (discussed below), via a D-channel. Since the voice and data communications between the operator position 160 and networks 154 and 155 are bidirectional, the multiplexor units 164 and 209 are also bidirectional multiplexor/demultiplexor units, and the A/D converter 207 is a combined analog/digital and digital/analog converter. The same is true for corresponding units associated with other operator positions and other ports of FIGS. 1 and 8. For convenience, such multiplexor/demultiplexor units are called multiplexors herein.

In an alternative arrangement, the multiplexor 209, or the equivalent multiplexor 1209 of agent position 1110 (FIG. 8), may be physically located outside the operator or agent position, and the B-channel and D-channel signals fed directly into the position. This may be desirable, for example, if the interconnection path, such as path 116, carries signals on a multiplexed digital transmission facility and the function of the multiplexor is carried out by facility termination equipment, such as multiplexor 114. For clarity, operator or agent positions without such a multiplexor are called operator or agent communications equipment herein.

In another alternative configuration, the interconnection path 162 may be directly connected to a port on circuit switching network 154; the D-channel from the operator position is then switched in circuit switching network 154 for connection to a port on packet switching network 155.

The D-channel connected to an operator position is also advantageously used for accessing remote data bases, such as remote data base 150, accessed via packet switching network 155 and data communication path 169, connected to packet switching network interface port 169A. Remote data base 150 may contain data for indicating locations that are temporarily hard to reach through the public telephone network. Such a data base may be queried before setting up an operator assistance call. Alternatively, a remote data base 149 might be centralized for a region, and might be accessible via data communication path 147, connected to packet switching network interface port 147A, through a data network 148.

Figure 10:
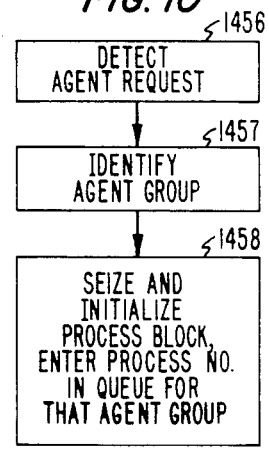

In order to control operator assistance calls, agent calls, and other calls, operator assistance system 1 is controlled by a stored program controlled processor 151. Processor 151 includes a central processing unit 152 and memory 153. Processor 151 communicates through data path 156 via packet switching network 155 with any of the operator positions 160, . . . , 161. Processor 151 controls circuit switching network 154 through control path 157, and packet switching network 155 through data and control path 156, connected to packet switching network interface port 156A. Processor 151 contains the programs outlined in the flow diagrams of FIGS. 5–7 and execute the appropriate ones in order to control the process of setting up circuit and data connections among customers, operator positions and data bases. Processor 151 which also communicates with an agent position 211 (FIG. 1) also contains the programs outlined in FIGS. 10, 13 and 14, for communicating with agent positions, although not every operator assistance system needs to contain these programs. Processor 151 and a comparable processor 1101 (FIG. 8) may be a multiprocessor system if high processing capacity or distributed processing is required.

In the case of an operator assistance request to be served by one of the operator positions 160, . . . , 161, a call such as a person-to-person call or calling card call is set up from one of the incoming lines or trunks 170, . . . , 171 to one of the outgoing lines or trunks 180, . . . , 181 before or after an operator assistance request has been served. Processor 151 routinely monitors these lines and trunks and controls circuit switching network 154 to make the necessary voice connections. In addition, when an operator assistance request is detected by processor 151, one of the operator positions 160, . . . , 161 is bridged onto the call connection or a connection is made between the operator position and an incoming line or trunk 170, . . . , 171, so that the operator may have a voice connection to the customer placing the call. The operator requests information from the customer and keys call control information into the system from the operator position. Thereafter, the operator position is disconnected from the call.

When the operator at operator position 160 is initially connected to a customer, an initial display control message from processor 151, sent via packet switching network 155 to the operator position, sets up the operator position display 202. This display could be any device having a controllable visual output, including a video terminal or a printer. The visual output informs the operator of the major details of the call so that the operator may interact verbally with the customer and receive additional information. The operator, using keyboard 203, then keys further data into the operator position. The terminal processor 201 converts this keyed input into a data message which is sent to processor 151 via packet switching network 155. Processor 151 may alter the configuration of the call (for example, by letting a person-to-person call complete to its destination) or may record information about the call (such as the calling card number of the calling customer) on the basis of the data keyed into the operator position by the operator.

An operator assistance call will now be described from the original request for operator assistance to the disconnection of the assisting operator position. In the first part of this description, the call will be described in terms of the call configuration and the memory changes made at various times. Thereafter, the flow of the program used to control the call configuration and the memory 153 of processor 151 is described. The call, whose configurations are illustrated in FIG. 2, is from an originating customer on incoming line 170 going to a terminating customer via outgoing trunk 180 using operator position 160 to assist in setting up the call.

A person-to-person call is used as an example. When this call is placed, the calling customer dials "0" followed by the directory number of the called customer. For this type of call, an operator assistance request is detected when the end of dialing has been recognized. Operator position 160 is connected to the incoming line 180 after the customer has finished dialing. Through verbal communications, the operator at operator position 160 finds out from the customer the call type (person-to-person) and the name of the requested called party. The operator then keys data into the keyboard 203 of operator position 160, which data when processed by terminal processor 201 and transmitted to processor 151 indicates that a connection should be set up between the calling and called customers while the operator remains connected. After the operator has verified that the requested called party is on the line, the operator keys further data into keyboard 203, which data when processed by terminal processor 201 and transmitted to processor 151, causes the processor to start charging for the call, and to bill the call as a person-to-person call. The operator at position 160 also signals to processor 151 to disconnect the operator position from the call.

Figure 2:
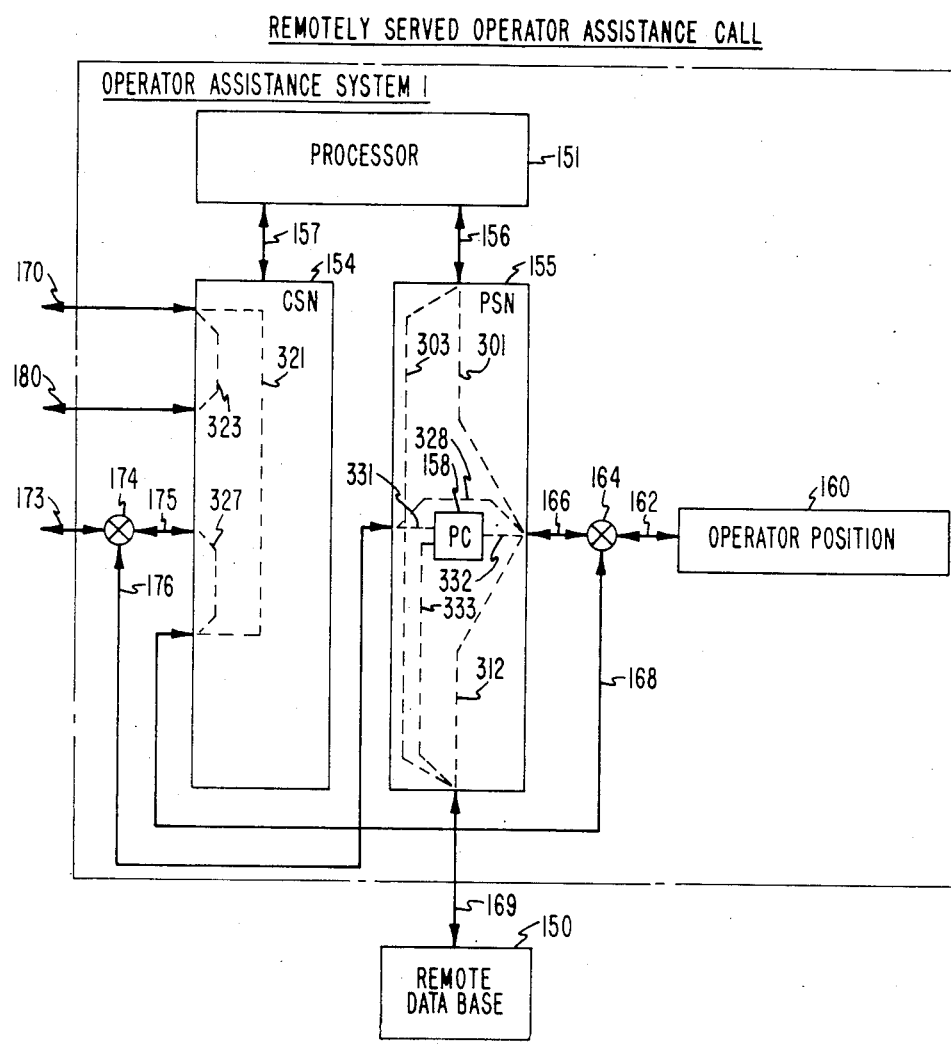
FIGS. 2 and 9 are call configuration diagrams showing the various voice and data connections used in illustrative calls.

FIG. 2 shows various voice and data connections of this call. When the customer has finished dialing and processor 151 has detected the operator assistance request implied by that completion of dialing, an operator position is connected to the incoming line. This connection is illustrated as being from line 170 via connection 321 in circuit switching network 154, thence via path 168 to multiplexor 164, to interconnection path 162, to operator position 160.

Subsequently, when the operator has indicated that the connection to the called customer is to be established, connection 323 between line 170 and outgoing trunk 180 is added to the existing connection 321 between line 170 and operator position 160. As previously mentioned, circuit switching network 154 described herein is a digital network. The operator assistance system is equipped with well known digital conference circuits, considered for clarity to be part of the circuit switching network, which allow three-way connections to be set up. This permits a third port, such as the port 180A to outgoing trunk 180, to be added to an existing connection.

In addition to the voice path between the incoming line and the operator position, described above, a data path to operator position 160 must be established. In the illustrated system, this data path includes a data connection 301 in packet switching network 155 between data path 156 to processor 151 and data path 166 between packet switching network 155 and multiplexor 164 leading via interconnection path 162 to operator position 160.

Processing of the exemplary call begins when a customer origination is initially detected for line 170. Under the control of processor 151, signaling information (the dialed number) is accumulated and stored in memory. When complete signaling information has been obtained, processor 151 recognizes that the assistance of an operator is required, and enters a request into a queue 420 (FIG. 3) in memory. Audible tone is sent back to the originating customer to let that customer know that a connection to an operator is being attempted.

At some later time, the queue 420 (FIG. 3) is examined by processor 151. Processor 151 sets up connection 321 (FIG. 2) in circuit switching network 154 between the incoming line 170 and operator position 160. Processor 151 sends an initial display control message, based on the data previously accumulated from and about the customer on line 170, through data connection 301 in packet switching network 155 to operator position 160 to control the display of initial call data on display 202 at that operator position. The operator at operator position 160 communicates with the customer on line 170 and uses keyboard 203 to key data which is processed by terminal processor 201 and transmitted to processor 151. Processor 151 records data about the call (such as a calling card number) or changes the configuration of the call (for example, by setting up the call to a distant switching system). At the end of the operator transaction, processor 151 disconnects operator position 160 from the connection to line 170, and updates its call records and makes any necessary billing entries in its memory.

Figure 5:
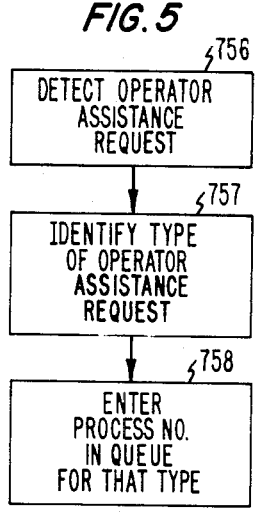
FIGS. 5-7, 10, 13, and 14, are a series of program flow diagrams illustrating the data processing and control functions for controlling illustrative calls.
Figure 7:
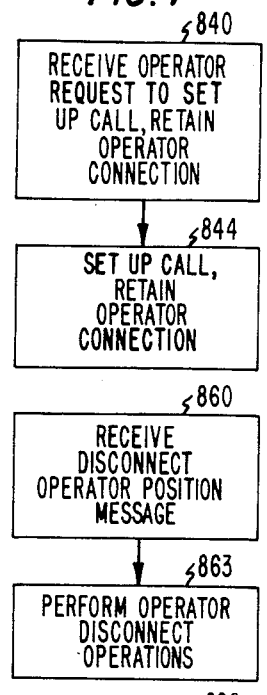
Figure 6:
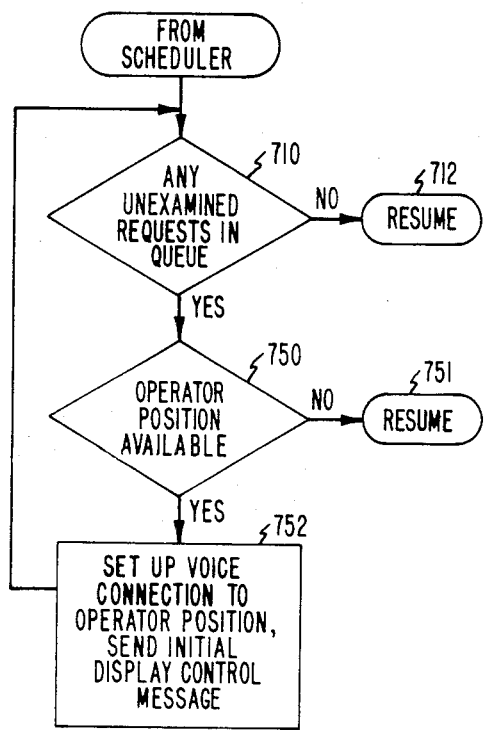

Processor 151 contains a set of call processing programs, the pertinent ones of which are outlined in the program flow diagrams of FIGS. 5-7, for controlling operator assistance calls and operator assistance requests. In addition, each of processors 151 (FIG. 1) and 1101 (FIG. 8) contains a program called an operating system for controlling scheduling and the transmission and reception of messages among processes in one or more processors. Operating systems are well known and commonly used in the art. One such is the Duplex Multi-Environment Real Time (DMERT) operating system, described in Grzelakowski et al.: DMERT Operating System, *Bell System Technical Journal*, Vol. 62, No. 1, Part 2, January 1983, pp. 303-322. According to common practice in many operating systems, each job or process in a system is identified by a process number. Each active process has an assigned block of memory called a process block. The operating system maintains a list of all active process numbers and is able to find the location in memory of the process block for any process number. By using the program facilities of the operating system, a source process, residing in one processor, communicates with a destination process by sending a message, whose transmission and reception is handled by the operating system, to that destination process which may be resident in the same or a different processor.

Further details of the processing of the call can best be understood by reference to FIGS. 3-7 which show memory layouts and program flow diagrams. Queue 420 (FIG. 3) uses a well known fifo (first in, first out) queue discipline which has the characteristic that the most recently entered request will be the last to be served. Each request for a connection to an operator position is stored in the queue as a process number. This number acts as a link to a block of memory, called the process block, (described below with respect to FIG. 4), which contains all pertinent information about the process, in this case, an operator assistance call.

Figure 3:
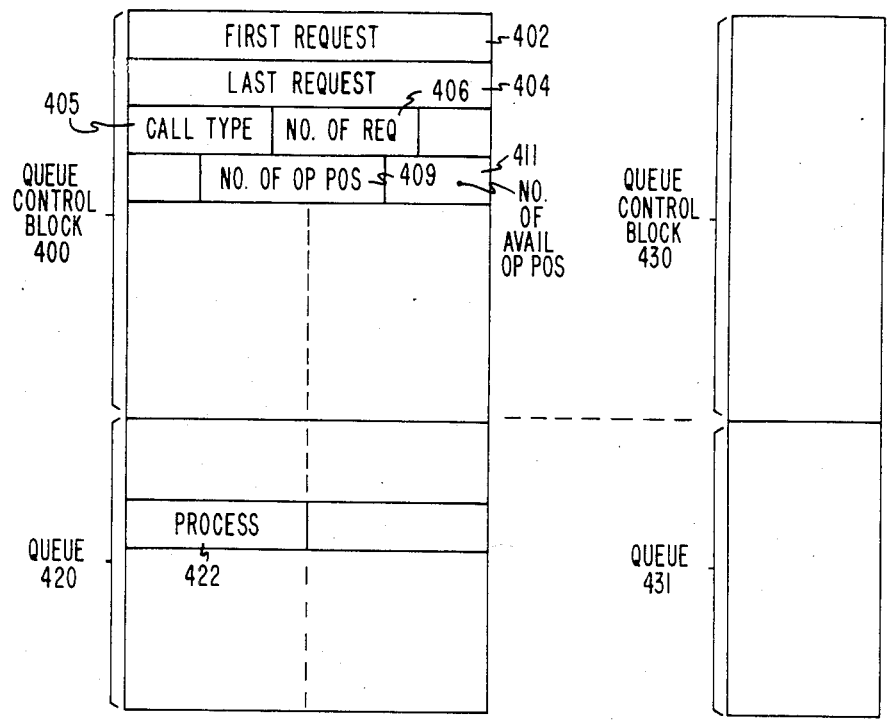
FIGS. 3 and 11 are memory layouts of queues used for storing customer requests.

Each operator assistance system has one or more queues, each associated with a team of operator positions. FIG. 3 shows two such queues 420 and 431 each with its control block 400 and 430, respectively. Each queue is defined by a call type indicator 405, indicating the operator assistance request type. Different operator teams may serve different types of operator assistance requests. For example, a different team might be used for international calls than for toll and assistance calls within one country. Some teams may serve requests from more than one queue, although it is assumed for clarity herein that each operator team only serves one queue. Techniques for allotting operator positions from one team to more than one queue are well known in the art and are generally based on the principle of keeping delay, relative to a target maximum for each queue, equal in the several queues served by one team. The same principles can be applied to different teams of agents working for the same employer (sometimes serving requests from more than one queue) or different employers (each team serving requests from only one queue).

The queue control block 400 (FIG. 3) associated with queue 420 contains a first request indicator 402 and a last request indicator 404 to control the loading and unloading of the queue in a well known manner. It also contains a variable 406 indicating the number of entries in the queue. The queue control block also includes a call type indicator 405, described above. The queue control block also contains a count of the number of active operator positions 409 in the team that handles the call type of this queue control block: this count is incremented whenever an operator opens an operator position and decremented whenever an operator closes an operator position. The queue control block also contains a count of the number of available operator positions 411; this count is incremented whenever a position is released or opened, and decremented whenever a position is seized or closed. Each request in the queue, such as the request shown in queue 420, contains a process number 422, which serves as a link to a process block, such as process block 450 (FIG. 4) containing call data for that request.

Figure 4:
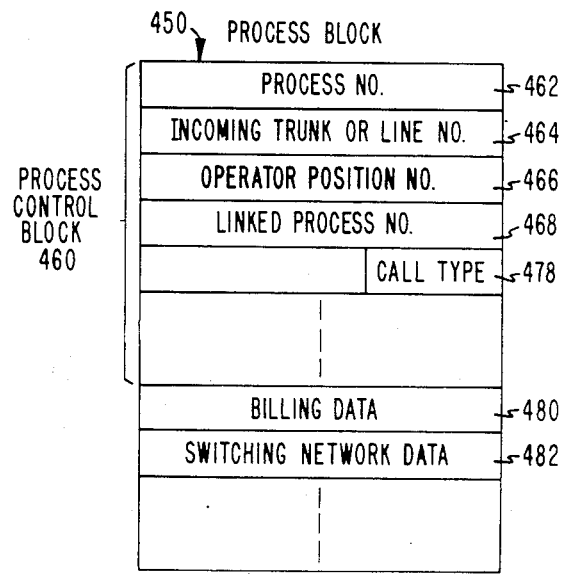
FIGS. 4 and 12 are me:mory layouts of process blocks used for storing the data of calls.

FIG. 4 shows a typical process block 450, one of many such that are present in a system when that system is processing many calls. Each process block contains pertinent information required to control a call. Such process blocks are used in prior art systems. Process control block 460, within process block 450, contains a process number 462, discussed above, used to identify the process. The process control block also contains the identification of the incoming trunk or line number 464; the associated operator position number 466; the number of any linked processes 468 (such as a process for controlling communications with remote data base 150); and a call type indicator 478. In addition, the process block contains general data about the call, such as billing data 480 and switching network data 482 which describes the call configuration.

FIGS. 5–7 are flow diagrams of programs for loading and unloading the queue, for responding to requests unloaded from the queue, and for responding to operator position requests. Requests are loaded into one of the queues 420, . . . , 431 (FIG. 3) when the call processing program detects an operator assistance request (action box 756, FIG. 5), and identifies the type of operator assistance request (action box 757). The call processing program then causes a request, comprising the number of the process controlling that call, to be loaded in the queue for that type of operator assistance request (action box 758, FIG. 5). The queue is selected on the basis of the call type indicator 478 stored in the process block 450 of the call; the call type indicator is changed as the customer provides information by dialing or as the customer provides information verbally to the operator and the operator keys that information into the system.

At some later time, determined by a scheduler that is part of the operating system, the queue 420 (FIG. 3) is tested in a conventional manner for a fifo queue (test 710, FIG. 6) to see if there are any requests in the queue. If not, other work is resumed (action box 712). Otherwise, test 750 which tests for availability of active, i.e., attended, operator positions, is carried out. A test for availability of an active operator position is similar to a test for availability of a trunk or service circuit; techniques for maintaining the status of such availability are well known in the art. If no positions are available, there is no need for further work on the queue at this time and other work may be resumed (action box 751); the queue will be reentered later under the control of the scheduler. If an active operator position is available, one of these positions is selected using well known allotment techniques. For example, the operator assistance position that has been idle for the longest time may be selected. A voice operator assistance connection to the requesting customer is set up, and an initial display control message is sent to the position from processor 151 (action box 752, FIG. 6). Subsequently, the queue processing loop is reentered at test 710 (FIG. 6).

In the example call being considered in this case, a person-to-person call, no connection has been set up from the originating customer to the terminating customer at the time the operator assistance request is recognized, so that the initial voice connection to the operator position is simply to the incoming line or trunk. However, in the case of other operator interventions such as an operator request for coin overtime deposit, a connection may already be established in which case the operator simply bridges onto that existing connection.

In the case of a person-to-person call such as the exemplary call, after the operator has communicated with the originating customer and recognized that a person-to-person call is to be set up, the operator keys a request asking that the call be set up and that the operator remain connected to the call after such setup. This request is processed by terminal processor 201 and sent to processor 151. The operator request is received in processor 151 system (action box 840 FIG. 7). The call is set up and the connection to the operator position controlling this call is retained (action box 844).

After the call from the calling customer to the called customer has been set up, which may require connections in other switching systems besides operator assistance system 1, the operator verifies that the requested called customer is now connected and that the person-to-person call has therefore been satisfactorily established. At this time, the operator keys a request, processed by terminal processor 201, to be disconnected from the customer connection and to start charging for the call. The response to the operator request is illustrated in FIG. 7 in the program sequence starting with action box 860 in which a processor receives this message. The operator position is disconnected (action box 863), and other records, such as the call records in the process block, and billing records are updated.

The arrangements described above (FIGS. 1–7) can also be used for a number of other services. FIG. 1 shows packet switching network 155 connected to a data communication path 169 which is connected to a remote data base 150. This data base 150 can then be accessed from operator position 160 via data connection 312 (FIG. 2) through packet switching network 155. For example, this data base might contain information about locations in a national public telephone network which are temporarily hard to reach. If a customer on incoming line 170 calls an operator on a 0- call (i.e., a call in which the customer only dials 0) and indicates that he has been having difficulty reaching another customer in a certain area, the operator can verify whether that area is temporarily inaccessible. If the area is not inaccessible, the operator can send a request to processor 151 to set up the connection between the two customers. In those circumstances, the customer is connected to operator position 160 via path 321 (FIG. 2) and the operator is connected through connection 312 in packet switching network 155 to data communication path 169 to the remote data base 150. Multiplexor 164 combines the voice signal from the customer on line 170 and the data signal from data communication path 169 to generate an integrated signal to operator position 160. Information carried by the data signal is used to control the operator position display 202 and the voice signal is used to communicate with the operator. Alternatively, the data base might be data base 149, accessed via data communication path 147 and data network 148 (FIG. 1).

The accessing of a data base is illustrated in the flow diagram of FIG. 7 starting with action box 880. An operator keys a request for data from a remote data base which is processed by terminal processor 201 and sent as a request message. This message is received by processor 151 (action box 880). Processor 151 sends a message conveying the request to remote data base 150 (action box 882) using data connection 303 in packet switching network 155 (FIG. 2). In order to permit the response to be routed to operator position 160, processor 151 sets up (action box 884) a data connection 312 (FIG. 2) between the data communication path 169 and data path 166 which leads to operator position 160. Subsequently, the operator position receives a response from remote data base 150, which response controls the operator position display 202 to give the operator the desired information. Alternatively, a data connection 312 could be set up directly between the operator position 160 and the remote data base 150 to handle both the request and the response if the packet switching network could respond directly to the request without requiring control data from processor 151. A packet switching system such as the Packet Switching System 1 (PSS1) manufactured by AT&T Technologies, Incorporated, can respond directly to such requests.

In some cases, the customer will have an ISDN terminal. Such a customer is shown in FIG. 1 as appearing on line 173. This customer terminates in operator assistance system 1 on port 173A at a multiplexor 174; the customer's B-channel (voice signal) is then directed over path 175 to circuit switching network 154 while his D-channel (data signal) is routed via path 176 to packet switching network 155. This is shown diagrammatically in FIG. 2 in which customer 173 is routed to operator position 160 via data connection 328 through packet switching network 155 and is routed via connection 327 through circuit switching network 154. Both the voice and data signal are routed to multiplexor 164 which is connected to the interconnection path 162 which connects the multiplexor 164 to multiplexor 209 of the operator position 160. The data and voice connections may be made independently so that the customer on line 173 may only have a voice connection to operator position 160; his data connection may be used for other purposes, for example, for signalling to processor 151.

Operator assistance system 1 is also equipped with a protocol converter 158. The protocol converter is shown as part of the packet switching network 155. If, for example, the protocol used with data communication path 169 is different from the protocol used in the operator position or used by one of the ports connected to the operator assistance system, the protocol converter converts between the two protocols. Protocol converters are well known in the data switching art. For example, when the protocol of the operator position 160 does not match the protocol of the data communication path 169, instead of using a packet switching network connection such as connection 312 (FIG. 2) between the operator position and the data communication path 169, data switching network connections 332 and 333 are used in order to insert protocol converter 158. As another example, if the protocol of incoming line 173 does not match the protocol of the operator position, then the data signal on data path 176 from incoming line 173 is routed via data connection 331 in packet switching network 155 to protocol converter 158 and via data connection 332 from protocol converter 158 to multiplexor 164 for transmission to operator position 160. While the protocol converter 158 is shown inside packet switching network 155 in this example, the protocol converter could also be located outside the packet switching network, for example, between packet switching network 155 and data communication path 169.

An operator at an operator position can also request that a separate voice connection be set up, for example, to consult with another operator. This other connection, for example, to an outgoing trunk, such as outgoing trunk 181, can be set up on the basis of a control message sent from the operator position 160 to processor 151, via packet switching network 155. The control processor controls the setting up of such a path and may either hold the original path to the customer or incoming line 170 or set up a three-way voice connection. The same types of arrangements can be used by agents at agent positions such as agent position 211.

Agent Position Calls

Figure 8:
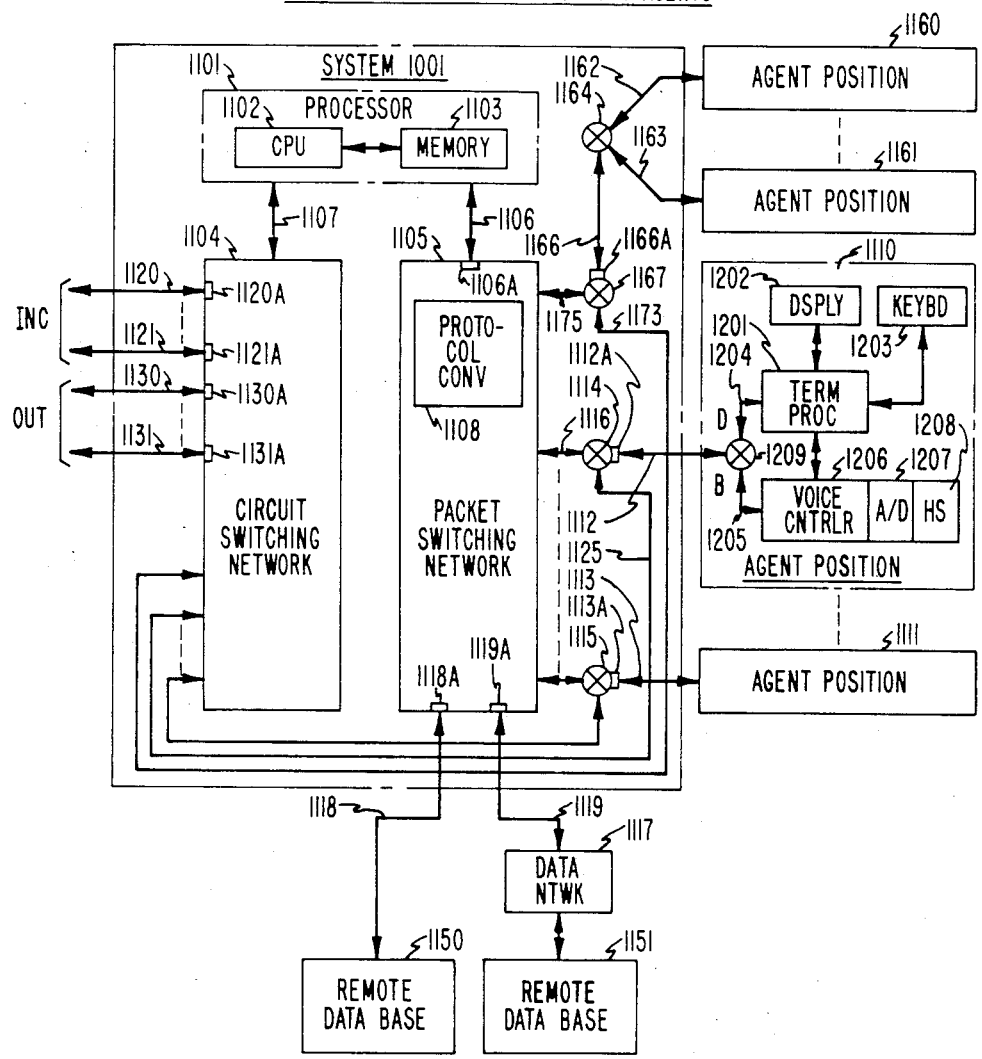

FIG. 8 shows a telecommunication system 1001, which may or may not also serve operator positions, for serving agent positions used by agents or clerks of a business. These agent positions may be used by an agent for, for example, taking orders. The methods of communicating with these agent positions are generally the same as those used for communicating with an assistance operator except that normally only operators may request certain changes in the configuration of a customer call. Further, the agent position communicates primarily with an external data base, whereas the operator position communicates primarily with a control processor. The customer communicates by voice with the agent who communicates via a data channel, in this case, a D-channel with the remote data base. For example, the agent may accept airline reservation orders verbally received from incoming customers, and the remote data base may be a data base used for such airline reservations.

System 1001 (FIG. 8) is controlled by processor 1101, which includes central processing unit (CPU) 1102 and memory 1103. Processor 1101 communicates via control path 1107 with circuit switching network 1104 and via control and data path 1106, connected to packet switching network interface port 1106A, with packet switching network 1105. Incoming lines 1120, ..., 1121 and outgoing lines 1130, ..., 1131 are connected to ports 1120A, ..., 1121A, 1130A, ..., 1131A of circuit switching network 1104. Agent positions 1110, ..., 1111 are connected to packet switching network 1105 and circuit switching network 1104 via interconnection paths 1112, ..., 1113, connected to ports 1112A, ..., 1113A, which are connected to multiplexors 1114, ..., 1115. Interconnection paths 1112, ..., 1113 are carried over interconnection facilities and may use multiplexed digital carrier systems if the agent positions are physically remote from the switching networks. The outputs of the multiplexors 1114, ..., 1115 are connected to the packet switching network 1105 and the circuit switching network 1104. Processor 1101 contains programs for controlling actions such as the ones described with respect to FIGS. 10, 13, and 14, and also contains an operating system.

FIG. 8 shows an exemplary agent position 1110, also an ISDN terminal. Entering agent position 1110 is an 80 kb integrated voice and data signal on integrated voice and data interconnection path 1112 from port 1112A on multiplexor 1114. Multiplexor 1114 is connected to circuit switching network 1104 via path 1125 and packet switching network 1105 via path 1116. The 80 kb integrated digital signal comprises one 64 kb B-channel and one 16 kb D-channel. The B-channel is used for voice communications and the D-channel is used for packetized data communications. The 80 kb integrated voice and data signals enter the agent position 1110 via interconnection path 1112 at position multiplexor 1209 which separates the D- and B-channel signals. The B- channel agent voice signal is routed from position multiplexor 1209 via path 1205 to a voice controller 1206, which handles such functions as echo suppression. The voice controller is connected to a bidirectional analog/digital converter 1207, which is connected to an operator's headset 1208 for generating acoustical outputs to and receiving acoustical inputs from an agent. The D-channel agent data input signal is routed from position multiplexor 1209 via path 1204 to terminal processor 1201. Terminal processor 1201 generates signals to control voice controller 1206, and display 1202 for generating visual outputs, and receives signals from a keyboard 1203, from which it generates agent data output signals to multiplexor 1209. Thus, an agent at agent position 1110 has a voice connection through circuit switching network 1104 to a customer via a B-channel, and a packet switched data connection through packet switching network 1105 to processor 1101, or to a data communication path such as 1118 or 1119, via a D-channel. In some cases, it may be desirable to locate the multiplexor 1209 outside the agent position. This may be economical where a group of agent positions are connected to the telecommunication switching system by a shared multiplexed facility. For clarity, an agent position without a multiplexor such as position multiplexor 1209 is referred to herein as agent communication equipment.

The interconnection path 1112 between agent position 1110 and multiplexor 1114 represents a path for carrying a combined signal. Interconnection path 1112 can be one of many paths being carried over a single multiplexed facility. This is illustrated explicitly with respect to the group of agent positions 1160, ..., 1161. These positions are all connected by paths 1162, ..., 1163 to multiplexor 1164 which is connected to interconnection path 1166, connected to port 1166A, which is connected to multiplexor 1167. Multiplexor 1167 is connected by path 1173 to circuit switching network 1104, and is connected by path 1175 to packet switching network 1105. In this illustration, paths 1166, 1173 and 1175 all carry signals for all of the operator positions 110, ..., 111. Further, if desired, multiplexor 1164 could generate two signals representing a B-channel and a D-channel to the agent communication equipment, and thus eliminate the need for a separate multiplexor such as multiplexor 1209 inside each agent position.

The packet switching network 1105 is also connected to remote data bases 1150 and 1151 via data communication path 1118 and via data communication path 1119 and data network 1117. Data network 1117 may be a public data network such as the General Telephone and Electric Telenet Network. Many data bases may be connected to such a network.

Protocol conversion circuit 1108 can be used if necessary to convert between the data protocol used by the agent positions 1110, ..., 1111 and the data protocol used for communicating, over data communication path 1118, connected to packet switching network interface port 1118A, or data communication path 1119, connected to packet switching network interface port 1119A for data network 1117, with the remote data bases 1150 or 1151.

Figure 9:
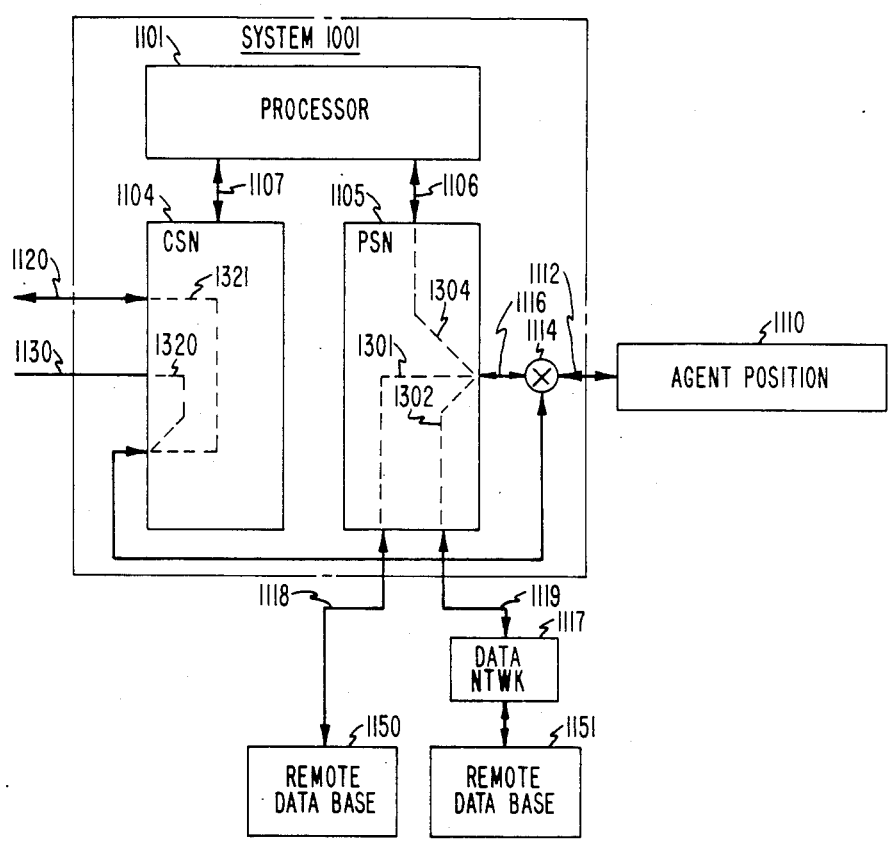

FIG. 9 shows the call configuration of an agent call set up using the system of FIG. 8. A customer on line 1120 wishes to communicate with a travel agent at one of the agent positions 1110, ..., 1111. The processor 1101 recognizes the request (action box 1456, FIG. 10), identifies the agent group of the request (action box 1457), seizes and initializes a process block for that call and enters the process number of that process block in the queue for that agent group (action box 1458).

Figure 11:
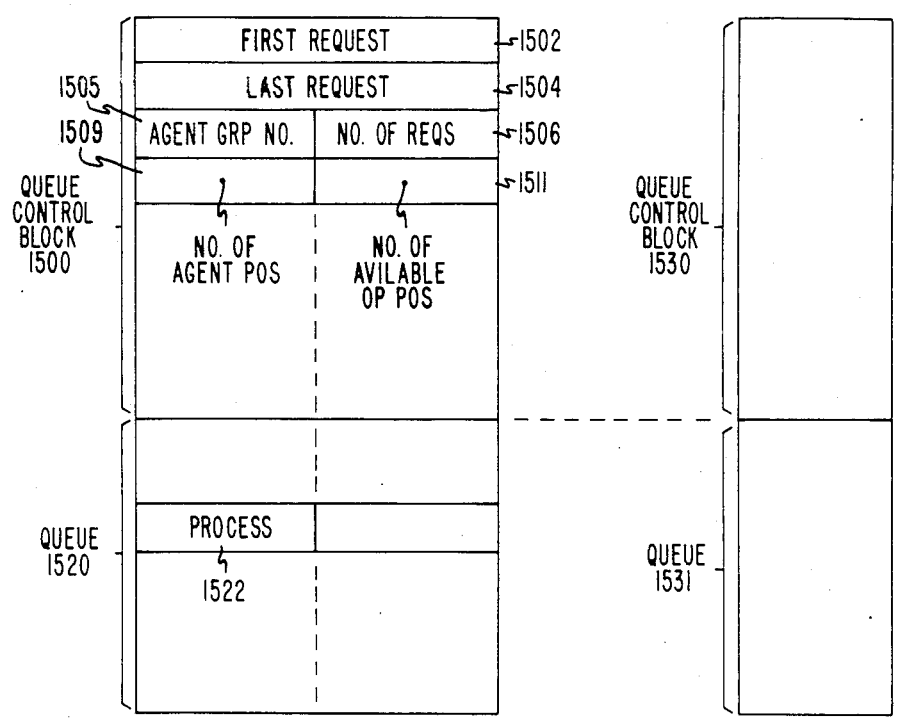
Figure 12:
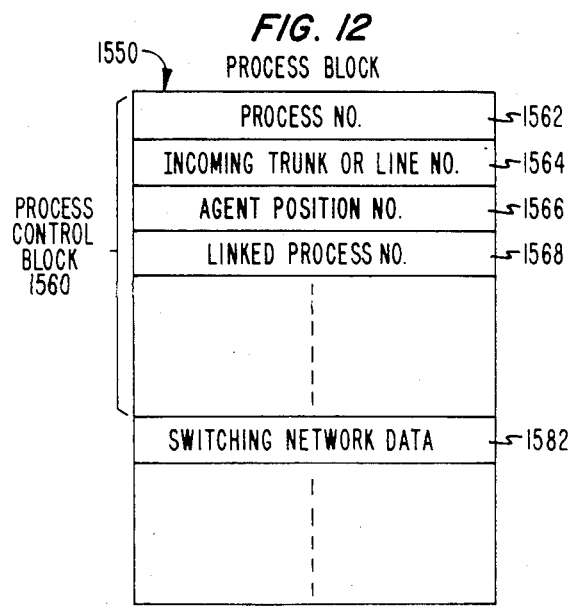

The queue (FIG. 11) and process block (FIG. 12) for agent calls are similar to the queue (FIG. 3) and process block (FIG. 4) used for operator assistance calls. Queue 1520 (FIG. 15) stores in each entry 1522 the process number of the process block which contains data describing the recognized request. The control block 1500 for queue 1520 contains pointers to the first request in the queue 1502, last request 1504, an identification of the agent group number 1505 (comparable to the type of operator assistance request 405 of FIG. 3), the number of requests in the queue 1506, the number of active agent positions 1509 for serving requests in the queue, and the number of those agents now available 1511 to service requests. A plurality of queues 1520, ..., 1531, each with its own control block 1500, ..., 1530, is served by each telecommunication switching system such as system 1001. Should it be found desirable to overflow requests from one queue to another, or from agents connected to one system to those connected to another, the same types of arrangements previously described with respect to operator assistance traffic can also be used.

Process control block 1560 (FIG. 12) of process block 1550 records the process number 1562 for identifying the agent call process, the incoming line or trunk 1564 of that call, the agent position number 1566, and a linked process number 1568 such as that of a process for communicating with a data base accessed by the agent. The process block 1550 also contains the necessary switching network data 1582 for describing and controlling the configuration of the agent call plus any other data necessary for communications among agent, customer, and one or more data bases.

Figure 13:
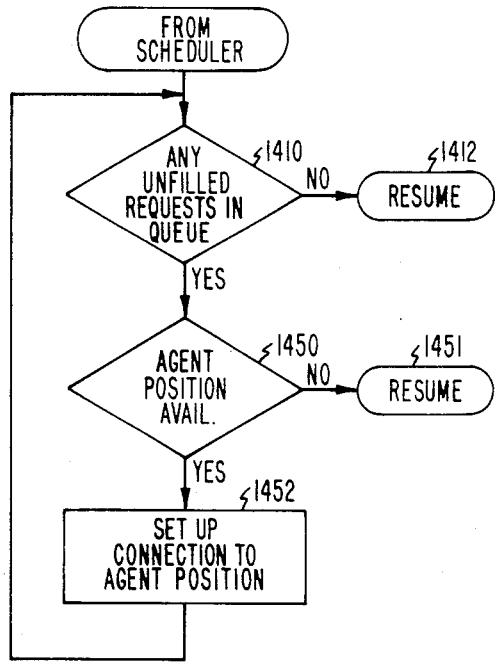

Sometime after the agent request has been recognized and entered into queue 1520, the scheduler of the operating system of processor examines the queue for unfilled requests (test 1410, FIG. 13). If no unfilled requests are in the queue, other work is resumed (action box 1412). Otherwise, a check is made (test 1450) by examining data item 1511 of queue control block 1500 (FIG. 11) to see if any agent positions are available in that group. If not other work is resumed (action box 1451). If at least one active (attended) agent position is available, say position 1110, an agent position is selected from the available agent positions and a voice connection is set up to that agent position (action box 1452). The connection is shown in FIG. 9 as connection 1321 through circuit switching network 1104, which connects the customer on line 1120 to multiplexor 1114, to interconnection path 1112 to agent position 1110.

The attending agent at selected agent position 1110 can now communicate verbally with the customer. In response to the customer's requests, the agent can generate a message to request a data connection 1301 through packet switch network 1105 to data communication path 1118 to remote data base 1150, for example, to query an airline reservation data base for flight availability. Message exchanges for accessing data bases are well known in the art and will not be further described herein. Based on the data messages exchanged between the agent position and the remote data base 1150, the agent may further communicate with the customer, for example, to convey flight availability data; if necessary, the agent may send further messages, such as an airline reservation request to the data base 1150.

Subsequently the agent may wish to communicate with remote data base 1151, for example, to make a hotel reservation. A data connection 1302 is now set up through packet switching network 1105 to data communication path 1119 to data network 1117 to remote data base 1151. Again, the agent first queries the data base for availability of a hotel reservation, communicates verbally with the customer, and, if necessary, sends further messages, such as a hotel reservation request to data base 1151.

Agent position 1110 may also communicate with processor 1101 through connection 1304 in packet switching network 1105, and through data path 1106. This data connection is used for requesting processor 1101 to set up a connection to one of the remote data bases 1150 and 1151, or to add a connection 1320 to some other source of verbal information, such as a remote agent connected via an outgoing line or trunk 1130, or to disconnect and/or make unavailable the agent position 1110.

Under this type of arrangement, interconnection path 1112 transmits an integrated voice and data signal carrying a B-channel and a D-channel. The agent at the agent position 1110 communicates verbally with the customer via the B-channel and the voice connection set up through circuit switch network 1104, and with the remote data bases 1150 and 1151 through the D-channel and the data connection set up via interconnection path 1112, multiplexor 1114, path 1116, and data connections 1301 and 1302 in packet switching network 1105 to the data communication paths 1118 and 1119 leading to the remote data bases 1150 and 1151. The specific remote data base and the data communication path, and, if necessary, data network leading to that data base can be selected under the control of processor 1101, accessed by agent position 1110 through data connection 1304.

Figure 14:
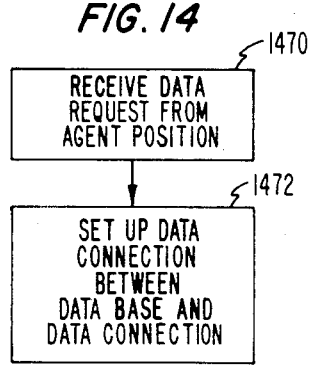

FIG. 14 shows the actions required by the processor 1101 for selecting an appropriate data base. The processor 1101 receives a request via data connection 1304 (FIG. 9) from the agent position such as position 1110 (action box 1470, FIG. 14). Based on this request, the processor 1101 sets up a data connection, such as connection 1301 to a remote data base, such as data base 1150 (action box 1472). When a change of data base is required, the agent sends a new request to the processor 1101 which selects the new data base in response to that new request.

Alternatively, if the packet switching network 1105 has the appropriate facilities, the data base can be selected directly under the control of the data message that is generated by the agent position. For example, a packet switch network such as the Packet Switch System number 1 (PSS 1, previously cited) has the capability for recognizing destination addresses directly.

The above description is considered to be only an illustrative embodiment of the invention, plus a number of suggested alternatives in parts of the embodiment. Other alternatives are possible without departing from the spirit of the invention. For example, if substantial amounts of data need to be exchanged between agent or operator positions and a data base, the second B-channel provided with full ISDN service may be utilized for this purpose. This B-channel can also be used for data communications with a customer, such as the ISDN customer on line 173, by attaching an output path (not shown) carrying the second B-channel to multiplexor 174 (FIG. 1), and connecting that output path to packet switching network 155 for high speed packetized data, or to circuit switching network 154 for circuit switched data. The second B-channel can also be used for data messages, while the D-channel is used for control messages, such as many of the messages sent to the control processor. It is to be understood that various and numerous other arrangements may be devised by one skilled in the art without departing from the spirit and scope of the invention. The invention is thus limited only as defined in the accompanying claims.

What is claimed is:

1. An operator assistance system comprising:
   operator position means, responsive to integrated voice and data input signals for generating acoustical outputs and visual outputs to an operator, and responsive to acoustical inputs and data inputs from an operator for generating integrated voice and data output signals;
   switching network means comprising a plurality of ports connectable to customer stations;
   interconnection means connected to said operator position means and said switching network means for transmitting said integrated input signals and said integrated output signals between said operator position means and said switching network means; and
   control processor means, connected to said switching network means, for generating control signals for controlling said switching network means, and for generating data signals for transmission to said switching network means;
   wherein said switching network means comprises switch multiplexing means responsive to said integrated output signals for generating output data signals and output voice signals, circuit switching means responsive to said control signals for transmitting voice signals received on one of said plurality of ports to said switch multiplexing means, and packet switching means resnonsive to said control signals for transmitting data signals received from said control processor means to said switch multiplexing means, wherein said switch multiplexing means is further responsive to said transmitted data signals and said transmitted voice signals for generating said integrated input signals, wherein said circuit switching means is further responsive to said control signals to transmit said output voice signals to said one of said plurality of ports, and wherein said packet switching means is further responsive to said control signals to transmit said output data signals to said control processor means; and
   wherein said control processor means is responsive to said output data signals to generate said control signals.

2. An operator assistance system comprising:
   operator position means, responsive to integrated voice and data input signals for generating acoustical outputs and visual outputs to an operator, and responsive to acoustical inputs and data inputs from an operator for generating integrated voice and data output signals, wherein said operator position means comprises position multiplexing means, and operator communication means comprising acoustical conversion means responsive to operator voice input signals and said acoustical inputs, respectively, for generating said acoustical outputs and operator voice output signals, respectively, and input/output means responsive to said data inputs from an operator for generating operator data output signals, and responsive to operator data input signals for generating said visual outputs, and wherein said position multiplexing means comprises means responsive to said integrated input signals for generating said operator voice input signals and said operator data input signals, and responsive to said operator data output signals and said operator voice output signals for generating said integrated output signals;

switching network means comprising a plurality of ports connectable to customer stations;

interconnection means connected to said operator position means and said switching network means for transmitting said integrated input signals and said integrated output signals between said operator position means and said switching network means; and control processor means, connected to said switching network means, for generating control signals for controlling said switching network means, and for generating data signals for transmission to said switching network means;

wherein said switching network means comprises switch multiplexing means responsive to said integrated output signal for generating output data signals and output voice signals, circuit switching means responsive to said control signals for transmitting voice signals received on one of said plurality of ports to said switch multiplexing means, and packet switching means responsive to said control signals for transmitting data signals received from said control processor means to said switch multiplexing means, wherein said switch multiplexing means is further responsive to said transmitted data signals and said transmitted voice signals for generating said integrated input signals, wherein said circuit switching means is further responsive to said control signals to transmit said output voice signals to said one of said plurality of ports, and wherein said packet switching means is further responsive to said control signals to transmit said output data signals to said control processor means.

3. The operator assistance system of claim 2 wherein said input/output means comprises:
data input means for generating first intermediate signals;
a terminal processor responsive to said first intermediate signals for generating said operator data output signals and responsive to said operator data input signals for generating second intermediate signals; and
visual output means responsive to said second intermediate signals for generating said visual outputs.

4. The operator assistance system of claim 3 wherein said interconnection means comprises an integrated transmission facility and said integrated input signals and said integrated output signals are transmitted via a B-channel and the associated D-channel of said integrated transmission facility.

5. The operator assistance system of claim 4 wherein said packet switching means further comprises protocol conversion means for converting between different protocols of said data signals generated by said control processor means and of said data signals transmitted to said switch multiplexing means.

6. The operator assistance system of claim 4 wherein said integrated transmission facility comprises a multiplexed transmission facility for transmitting a plurality of B-channels and D-channels.

7. The operator assistance system of claim 4 wherein said control processor means is responsive to said output data signals from said packet switching means to generate control signals to control said circuit switching means to set up a voice connection between two of said ports.

8. The operator assistance system of claim 7 further comprising data communication means connected to said packet switching means wherein said packet switching means is further responsive to control signals from said control processor means to transmit data signals received from said data communication means to said switch multiplexing means, and to transmit said output data signals from said switch multiplexing means to said data communication means.

9. The operator assistance system of claim 8 wherein said packet switching means further comprises protocol conversion means for converting between different protocols of said output data signals from said switch multiplexing means and the data signals transmitted to said data communication means.

10. The operator assistance system of claim 8 wherein said data communication means is connected to a data network.

11. The operator assistance system of claim 10 wherein said data network is connected to a data base.

12. The operator assistance system of claim 11 wherein said integrated transmission facility comprises a multiplexed transmission facility for transmitting a plurality of B-channels and D-channels.

13. The operator assistance system of claim 8 wherein said data communication means is connected to a data base.

14. The operator assistance system of claim 13 wherein said integrated transmission facility comprises a multiplexed transmission facility for transmitting a plurality of B-channels and D-channels.

15. The operator assistance system of claim 4, wherein said control processor means is responsive to said output data signal from said packet switching means to generate control signals to control said circuit switching means to set up a voice connection between another of said ports and said switch multiplexing means.

16. The operator assistance system of claim 1, wherein a subset of said ports receive communication signals, wherein said circuit switching means transmits data signals representing said communication signals to said control processor means, and wherein said control processor means is responsive to said data signals representing said communication signals and to said output data signals from said packet switching means to generate said control signals.

17. An operator assistance system comprising:
switching network means, comprising a plurality of first ports for the transmission of voice signals to and the reception of voice signals from customer stations, and second ports for the transmission of integrated voice and data input signals to and reception of integrated voice and data output signals from operator positions; and
control processor means, connected to said switching network, for generating control signals, for generating and transmitting data signals, and for receiving data signals;

wherein said switching network means comprises switch multiplexing means connected to one of said second ports responsive to integrated output signals from said one of said second ports for generating output data signals and output voice signals, circuit switching means connected to said first ports responsive to said control signals for transmitting voice signals received on one of said first ports to said switch multiplexing means, and packet switching means responsive to said control signals for transmitting data signals received from said control processor means to said switch multiplexing means, wherein said switch multiplexing means is further responsive to said transmitted data signals and said transmitted voice signals for generating integrated input signals to said one of said second ports, wherein said circuit switching means is further responsive to said control signals to transmit said output voice signals to said one of said plurality of first ports, and wherein said packet switching means is further responsive to said control signals to transmit said output data signals to said control processor means; and wherein said control processor means is responsive to said output data signals to generate said control signals.

18. The operator assistance system of claim 17 wherein said one of said second ports is adapted to be connected to an integrated transmission facility comprising a B-channel and an associated D-channel.

19. The operator assistance system of claim 18 wherein at least one of said plurality of second ports comprises means for combining a plurality of B-channels and a plurality of D-channels.

20. An operator assistance comprising:
a plurality of ports connectable to customer stations;
operator communication means comprising voice access means and data access means for communicating with an assistance operator;
control processor means for generating processor control signals for controlling a switching network;
a switching network connected to said control processor means and to said plurality of ports; and
interconnection means for connecting said operator communication means to said switching network comprising a B-channel for transmission of voice signals and an associated D-channel for transmission of data signals between said operator communication means and said switching network, and position multiplexing means cooperating with said operator communication means for connecting said B-channel to said voice access means and said associated D-channel to said data access means;
wherein said switching network comprises circuit switching means responsive to said processor control signals for connecting said B-channel to one of the ports connected to switching network, and packet switching means responsive to said processor control signals for connecting said associated D-channel to said control processor means; and
wherein said control processor means is responsive to signals on said associated D-channel to generate said processor control signals.

21. The operator assistance of claim 20 wherein said switching network further comprises switch multiplexing means for transmitting said associated D-channel between said packet switching means and said interconnection means, and for transmitting said B-channel between said circuit switching means and said interconnection means.

22. The operator assistance system of claim 21 wherein two of said ports are connected to said circuit switching means and wherein said control processor means is responsive to said data signals received on said associated D-channel to generate processor control signals to control said circuit switching means to set up a connection between said two of said ports connected to said circuit switching means.

23. The operator assistance system of claim 22 further comprising data communication means connected to said packet switching means for communicating with a data base, wherein said packet switching means is further responsive to said processor control signals for connecting said associated D-channel from said switch multiplexing means to said data communication means.

24. In an operator assistance system for interconnecting a first and a second telephone customer station and a telephone operator position, comprising control processor means and switching network means for interconnecting said customer stations, said control processor means, and said operator position, a method of setting up an operator assistance call between said first customer station and said second customer station comprising the steps of:
receiving communication signals from said first customer station;
responsive to receipt of said communication signals, setting up a voice path, between said first customer station and said operator position, comprising a voice connection in said switching network means and a B-channel of an integrated voice and data facility interconnecting said switching network means and said operator position, and setting up a data path, between said control processor means and said operator position, comprising a data connection in said switching network means and a D-channel associated with said B-channel in said integrated facility;
sending an initial display control message from said control processor means through said switching network means to said operator position over said data path;
receiving a data message in said control processor means over said data path from said operator position;
responsive to receipt of said data message, setting up a voice connection in said switching network means from said first customer station to said second customer station.

25. In the operator assistance system of claim 24 wherein said operator assistance system further comprises data communication means, connected to said switching network and to a data base, the method of claim 24 further comprising the steps of:
receiving a first other data message in said control processor over said data path from said operator position;
responsive to said first other data message, setting up an other data path, between said data communication means and said operator position, comprising an other data connection in said switching network and said D-channel;

receiving a second other data message from said operator position over said D-channel and transmitting said second other data message through said other data connection via said data communication means to said data base; and receiving a third other data message from said data base via said data communication means and transmitting said third other data message to said operator position through said other data connection over said D-channel.

* * * * *

UNITED STATES PATENT AND TRADEMARK OFFICE
CERTIFICATE OF CORRECTION

PATENT NO. : 4,656,624

DATED : April 7, 1987

INVENTOR(S) : Johnny Collins, Michael H. Cooper, Douglas C. Dowden, Raymond J. Gill, Meyer J. Zola It is certified that error appears in the above-identified patent and that said Letters Patent is hereby corrected as shown below:

Column 18, line 40, change "resnonsive" to --responsive--.

Column 20, line 50, change "1" to --2--.

Signed and Sealed this

Third Day of November, 1987

Attest:

Attesting Officer

DONALD J. QUIGG

Commissioner of Patents and Trademarks